United States Patent [19]

Campbell

[11] Patent Number: 5,263,220
[45] Date of Patent: Nov. 23, 1993

[54] PIG PASSAGE INDICATOR MECHANISM INCORPORATING A FLUID SEAL CONSTRUCTION

[76] Inventor: Doug C. Campbell, 30 Sandpiper Dr., Sherwood Park, Alberta, Canada, T8A 0B8

[21] Appl. No.: 797,430

[22] Filed: Nov. 22, 1991

[51] Int. Cl.5 .............. B08B 9/04; G01B 5/14
[52] U.S. Cl. ............ 15/104.063; 73/40.5 R; 73/865.8
[58] Field of Search ......... 15/106.63; 73/40.5 R, 73/865, 865.08; 340/606, 593

[56] References Cited

U.S. PATENT DOCUMENTS

| | | | |
|---|---|---|---|
| 2,371,251 | 3/1945 | Mauldin | 15/104.063 X |
| 2,698,363 | 12/1954 | Rush | 15/104.063 X |
| 3,059,586 | 10/1962 | Brailsford | 92/170.1 X |
| 4,574,591 | 3/1986 | Bertsch | 92/170.1 X |

FOREIGN PATENT DOCUMENTS 34558 3/1977 Japan .................. 15/104.63

*Primary Examiner*—Daniel M. Yasich
*Attorney, Agent, or Firm*—Gunn, Lee & Miller

[57] ABSTRACT

A pig passage indicator is provided by the present disclosure and includes an elongate cylindrical hollow body having a sleeve which threads only inside the body. The sleeve captures a moveable pin or rod and a compressed resilient coil spring. The coil spring and pin connect with a plunger which has a contoured or hemispherical tip. The tip is positioned so that it protrudes into the pipeline. When a pig passes, it nudges the tip of the plunger, moves the plunger against the coil spring, and operates the rod to thereby form an alarm signal. The interior of the body is isolated by first and second spaced seal rings to define a fluid isolated chamber. Pipeline fluid does not get into this chamber.

10 Claims, 1 Drawing Sheet

PIG PASSAGE INDICATOR MECHANISM INCORPORATING A FLUID SEAL CONSTRUCTION

BACKGROUND OF THE DISCLOSURE

In operation of pipeline connected equipment, including pipelines which stretch across the open country and also including facilities where the pipeline may only be a few hundred feet in length, it is necessary to periodically conduct pigging operations. A pipeline pig is a cleaning device which is placed in the pipeline and transmitted along the pipeline with the fluid flow for cleaning. Sometimes it is used for batch separation. Pipeline pigs are also used in food manufacturing plants to periodically clean the lines to prevent the accumulation of deposits and the like which result from sedimentation or perhaps drying of particles. For instance, in plants which make liquid products such as catsup and the like, it is necessary for the sake of cleanliness to periodically pump a pig through the pipelines in the plant.

These pigs are normally sized to match the size of the pipeline. As a generalization, it is necessary to clean such pipelines often, but the frequency is in part dependent on the nature of the product flowing through the pipeline. In the handling of food products, it may be necessary to often pig the line, for instance once per day when the equipment is shut down and wash water is pumped through the lines to clear the lines. In that instance, it might be necessary to pump water through the line, then pig the line and thereafter pump more water through the line to remove deposits and accumulations within the pipeline. In a large food processing plant, there might be many points of entry for pigs at various locations because the plant can have numerous pipelines and it is therefore necessary to know the precise whereabouts of all pigs that are placed in the piping system. Ordinarily, the pipes are made of metal and they are not transparent. Occasionally, translucent or clear line material will be used, but it generally will not stand up, and it also provides a different kind of surface which may attract and hold an excessive amount of debris, deposits and the like, thereby increasing the risk of spoilage of the product.

In a milk processing plant it is desirable that certain types of stainless steel be used. In other food processing plants it is again typically required that the pipes and connective lines be formed of stainless steel, and in that setting, it is very difficult to locate the pipeline pigs. It is highly undesirable that a pig be left in the line after food processing begins in the next work shift.

The present apparatus is a pipeline pig passage indicator which provides a signal. This signal is formed after the pig has traversed the pipeline. In a large food processing plant, it might be necessary to install as many as 400 to 500 units of the pigs passage indicators so that pig whereabouts can be determined in view of the fact that the lines are circuitous, and may connect with numerous valves so that the pigs are intended to travel in a particular direction are not permitted to be diverted and found elsewhere at the plant. Accordingly, a pig passage indicator is an extremely important device to know with certainty the location or whereabouts of a pig in the plant. The present apparatus sets forth such a device and equipment.

Pig passage indicators are believed to be old. Many have been developed for transcontinental pipelines where the pig is a very large object. To avoid intrusion in the pipeline, magnetic pig detectors can be used especially where the pig is formed with metal. A common type of pig includes a metal core or spine which extends the length of the pig and which supports resilient cups, wipers or the like deployed around the central metal member. That can be easily picked up by a magnetic detector which observes a change in flux with the passage of the ferrous materials making up the pig body. The present apparatus is a pig passage indicator which responds to the passage of a pig which is substantially full gauge in the pipeline. By that, reference is made to the fact that it responds to a pig which fills the pipeline because it has sufficient body to trigger operation of the equipment. The detector protrudes into the line but it does not extend sufficiently fat into the line that it can possibly snag or otherwise hang a pig traversing the line. When that occurs, difficulties arise in clearing the line of the stuck pig.

The pig passage indicator of the present disclosure further includes an area which is exposed to the fluid in the pipeline. That is an area where nasty accumulations from the flowing material can otherwise accumulate and create problems. In the instance of petroleum based products and especially with flowing oil which has not yet been processed (for example oil flowing from gathering lines in an oil field) at a refinery, there is the tendency that the oil will form a paraffin coating in the pipeline. This coating can accumulate and does accumulate especially in the areas where the flow is less turbulent. This possibility arises in pig passage indicators where there is an area within the equipment where the oil in the line can fill an unflushed region, and there is a tendency for the paraffin to coat in that area, clogging the equipment. In processing plants, the problem is less associated with coating than it is with the collection of a thin film of the sediment from the processed food which might otherwise harbor and grow underirable bacteria. In that particular instance, the pig passage indicator poses the problem in that it typically includes nooks and crannies inside the equipment which are exposed to the flowing product and which regions may accumulate a coating, and the coating itself may harbor and grow an infestation of undesired bacteria. This device avoids such problems.

The pig passage indicator of the present apparatus is intended for use with a pipeline and is particularly able to handle a pipeline operating at a wide range of pressures. For instance, the present apparatus can be used at pressures prevailing in food processing plants in the range of up to about 150 psi. It likewise can operate with oil lines which operate at pressures up to about 500 psi. There is no reason why the present apparatus will not function successfully at pressures up to about 2,000 psi. Higher pressures can be achieved, but that requires incorporation of additional seals to prevent leakage. Suffice it to say, the present apparatus is adaptive in that, for a given seal construction, it is able to withstand any pressure that occurs within the pipeline and hence within the pig passage indicator. The present apparatus incorporates a first and second seal construction so that pressure within the indicator builds up in a sealed area so that fluid in that area is not commingled with fluid in the pipeline. Impurities from the pipeline therefore do not penetrate and enter into the pig passage indicator of this disclosure.

The two seals just mentioned therefore isolate the fluid within the pig passage indicator to assure purity and cleanliness resulting from this isolation, and they prevent commingling with the fluids in the pipeline.

The present apparatus is therefore summarized as an improved pig passage indicator having a protruding and movable probe which extends into the pipeline. It is forced out of the way on movement of a pig through the pipeline. It contacts the pig with a nose which is shaped so that it will not snag or otherwise trip a pig, and especially a full gauge pig. Moreover, it is constructed so that it can mount at any location along the pipeline and thereby enable detection of pigs traveling along the line. The contact with the pig is made by the protruding movable member which is sensitive to passage of the pig. It is forced radially out of the way from the pipeline. It is forced to move away from the pipeline by means of the pig, operating against a coil spring which otherwise provides a bias. The coil spring is captured within a pressure sealed housing. The movable probe of the present disclosure is connected with an enlarged plunger having a seat for the spring, and the plunger is positioned within a surrounding TEFLON seal sleeve. This sleeve isolated pipeline fluid around the plunger is interior of the tool. The plunger is connected to a movable push rod which, when moved by the plunger, provides mechanical linkage to an indicator mechanism. In one form, the indicator mechanism incorporates a pin which is moved, thereby retracting from holding a flag, which flag moves on release to an alarm condition. Another aspect of the present disclosure includes a flag mechanism which in one embodiment has a weight which is held in a particular position by the lock pin. When the pin is removed, the weight if then free to fall by gravity, rotating a flag from a withdrawn position to an upright or alarm position. This provides a mechanical indication of the equipment's operation. That equipment also cooperates with a magnet which is moved on transfer of motion through an appropriate linkage. When the magnet moves, it is brought into near proximity of a reed switch, and the reed switch detects magnetic movement and forms an output mechanical signal which is triggered by such movement and which in turn forms an indication given to an external observer.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
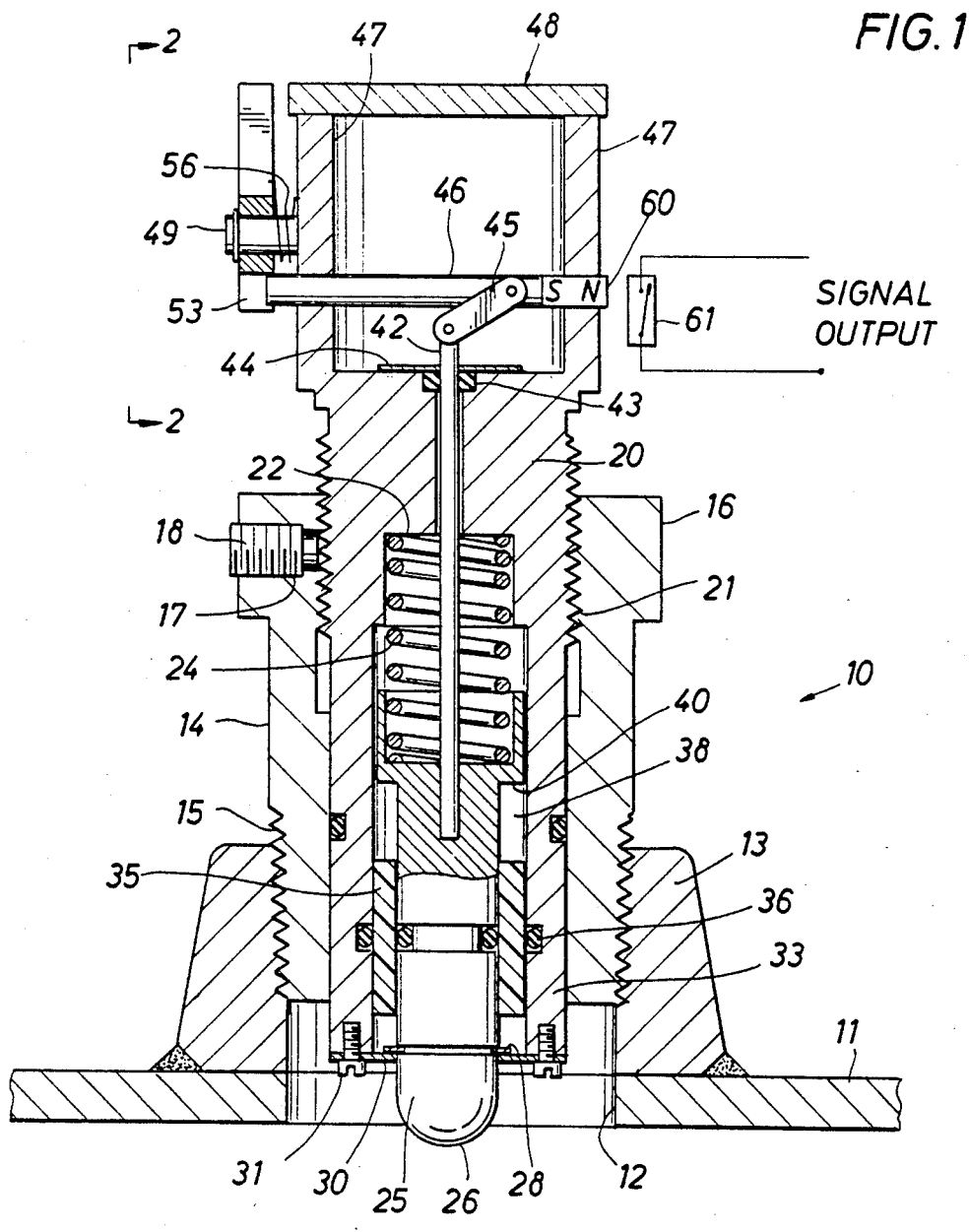
FIG. 1 is a sectional view through the pig passage indicator of the present disclosure which has been represented in sectional view along the length of the structure and which view particularly illustrates details of construction of a movable plunger and connected push rod cooperative with a bias spring and operative within a sealed chamber which is isolated by upper and lower seals.

Attention is now directed to FIG. 1 of the drawings where the numeral 10 identifies a pig passage indicator in accordance with the present disclosure which has been affixed to and attached to the sidewall of a pipeline where the pipe is indicated by the numeral 11. A hole 12 is formed in the pipe having a specified diameter, and a suitable fitting 13 is welded to the exterior of the pipe to define a threaded mount for the pig passage indicator. In turn, it is constructed with a hollow threaded body 14 which is equipped with threads at 15 for joinder to the mounting mechanism. This positions all the equipment so that movement occurs along a line at right angles to the lengthwise axis of the pipe 11 and which is a radial with respect to the axis of the pipe 11.

The body 14 is constructed with a surrounding collar 16 which can be in the form of flats suitable for engagement with a hand tool such as a wrench or the like for threading the body 14. There is an opening 17 formed at one of the flats or at one side, and a threaded setscrew 18 is placed in that to fasten the components together as will be described.

On the interior of the body, a sleeve 20 is joined to the body at a mating set of threads 21 which enables the equipment to be joined together. The sleeve 20 is axially hollow and has a shoulder 22 which permits a coil spring to be positioned in the sleeve. The spring 24 is a coil spring which is compressed to force a probe on a plunger 25 radially outwardly from the equipment and toward the interior of the pipeline 11. The probe on the plunger 25 has a rounded tip at 26. The tip of the probe 25 is smoothly rounded so that it does not present a surface which might otherwise snag a passing pig. In this particular arrangement, the tip portion of the plunger 25 which is exposed from the hole or lateral passage 12 resembles only a hemisphere, and is not a protruding shoulder that would otherwise block the pipeline. This plunger is constructed with a snap ring 28 which is positioned in a groove around the plunger which limits travel. A retainer ring 30 is positioned adjacent the snap ring 28 and is held in position by a mounting bolt 31. The mounting bolt 31 fastens to the lower skirt 33 of the sleeve 20. The skirt 33 is drilled and tapped internally and also provides a mounting surface for a first seal member 35. The seal member 35 is pressure isolated by internal and external seal rings at 36. The seal rings 36 prevent leakage of pipeline fluid past the seal sleeve 35. In the preferred embodiment, the sleeve 35 is preferably a relatively smooth, even slippery surface and is preferably formed of materials such as TEFLON (a registered trademark of the DuPont firm). The sleeve 35 provides pressure isolation so that fluid in the pipeline does not penetrate into the tool.

Above the sleeve 35, there is a chamber 38 which is filled with an isolation fluid which is maintained under pressure. The pressure levels in that chamber will be discussed. The plunger 25 extends upwardly and outwardly with a shoulder 40 which is a limit shoulder, that is, a shoulder which limits downward travel of the plunger in the event that the snap ring 28 were omitted. The shoulder 40 thus limits travel when it comes into contact with the seal sleeve 35.

Figure 2:
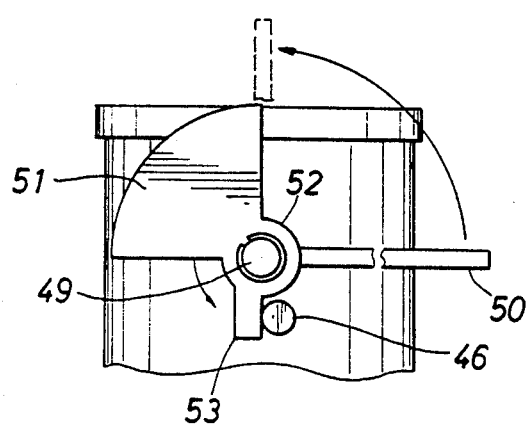
FIG. 2 is a view of the apparatus which is taken along the line 2—2 of FIG. 1 and which further illustrates the flag mechanism of the present disclosure constructed with a weight to enable movement in a particular direction at the urging of the weight which is permitted to rotate on operation of the pig passage indicator.

The plunger 25 is constructed with an axially drilled hole in it and that enables it to connect with a push rod 42 which extends upwardly and out of the sleeve 20. The rod 42 passes through a seal 43 which is locked in place by a retainer ring 44. The exposed end of the rod 42 is joined to a connective link 45 and in turn that is connected to a release pin 46. The pin 46 moves left and right as viewed in FIG. 1 of the drawings. When the plunger moves upwardly, the connective mechanism is arranged so that the pin 46 slides to the right. The pin 46 is used to form an output signal from the present apparatus. There are different types of alarms which are incorporated. They operate in response to motion of the plunger. Three different types of alarm devices will be discussed. In one instance, the pin 46 is guided by the sidewalls 47 in a housing 48. The housing encloses this signal indicating equipment. The housing has a short stub shaft or mounting axle 49, and a flag 50 is attached to it. In FIG. 2 of the drawings, the flag 50 is shown in the horizontal position. This horizontal position is the initial position of the flag until it has been released. A counterweight 51 is joined with the hub 52. Both of these mount on the shaft 49 which is permitted to rotate when the pin 46 is retracted away from the interfering position. The arrangement of the equipment shown in FIG. 2 relies on gravity to operate the flag 50. The pin 46 keeps the counterweight 51 in the up position. This counterweight, however, is free to rotate counterclockwise when the pin 46 is withdrawn from the stop 53. The stop 53 is incorporated for the express purpose of preventing rotation until pin withdrawal. When that occurs, rotation then follows and the flag 50 is pulled to an upright position shown in dotted line in FIG. 2 by the counterweight 51 which rotates to the bottom location relative to the mounting shaft 49. Rotation of the flag and counterweight is a signal from the operation of the equipment.

An alternate mode of operation of the alarm indicated by passage of a pig is accomplished by using the pin 46 to retract and thereby permit rotation of the flag mounting apparatus supported on the stub shaft 49. One way to rotate the equipment is to incorporate a coil spring 56 mounted so that the flag is rotated when released. The coil spring flexes for rotation, indeed, urges such rotation so that the flag 50 can be moved to the upright position of FIG. 2. The coil spring preferably is formed in several turns about the mounting shaft 49.

In a third mechanism for providing an alarm signal, the pin 46 is formed of suitable metal such as aluminum but has a brazed or adhesively attached magnet 60 at one end, and the magnet is positioned adjacent to a switch 61. The preferred form of switch is a reed switch which responds to the near proximity of the magnet and which forms a contact closure indicative of an output signal. Two conductors are shown in FIG. 1 which transfer the signal by forming an output electrical signal on switch closure. The conductors can be connected to a remote indicator.

The device is assembled in a careful fashion. It is assembled by filling the interior of the sleeve 20 with an isolated fluid. This fills the region above the sleeve 35 which provides a seal at the bottom below the seal ring 43 at the top end of the chamber. The seal 43 at the top end of the rod 42 assures chamber closure so that pressure isolation can occur notwithstanding variations in pipeline pressure. The sleeve 20 is threaded in the body 14 and these two are locked together by the setscrew 18. The setscrew preferably provides pressure on a very soft resilient plug which deforms, thereby avoiding damage to the threads on the sleeve 20. Conveniently, a slug of lead can be placed at one end of the setscrew 18.

The device provides a seal of the isolation fluid in the chamber above the sleeve 35 from the fluid that is flowing in the pipeline. In this arrangement, fluid (e.g., milk, catsup, gasoline, oil, etc.) introduced into the pipeline does not commingle with the isolation fluid in the pig passage indicator 10. The fluids isolated by the sleeve 35 and the internal and external seal rings 36. This construction and pressure fluid isolation enables the equipment to operate at any convenient line pressure yet without the harm that would occur should the product flowing in the pipeline enter the equipment. Moreover, isolation fluid within the chamber of the pig passage indicator 10 stays near the pressure which prevails in the pipeline. A typical pressure is a food processing plant might be in the range of 100 or 200 psi. Many petroleum products are pumped through pipelines at pressures as high as 500 psi. It is not uncommon to also use pressures as high as about 2,000 psi in many situations. The pig passage indicator can be used at all these pressures and is limited primarily by the quality of the seal 43 which might otherwise permit leakage of the isolation fluid from within the body 20.

The present apparatus can be made relatively large or small. It does not form a large or otherwise objectionable protrusion into the pathway of the pig which trips the device. Rather, it is mounted as illustrated so that the plunger is momentarily touched and is forced to the side. While the travel of the plunger radially outwardly away from the pipeline might be relatively short, such travel is sufficient to provide an adequate size signal.

This arrangement of a rounded probe on the plunger is helpful to avoid snagging. It represents something of a modest impediment to softer foam pigs. The present apparatus, however, controls stiffness by the incorporation and choice of a relatively light spring 24. While the travel is not terribly long, there is useful travel through the linkage 45 to the moveable pin 46. In that event, the signalling device is tripped and the flag indicates that pig passage has actually occurred. Recall as noted before that the output signal can be formed in one of three ways as described including removal of the pin from the gravity rotated flag, rotation of the flag at the urging of a coil spring, or formation of an output signal through an electrical signal formed at a reed switch. In terms of size, the apparatus of the present disclosure can be constructed to a diameter of about one and a half inches, perhaps two inches in a small model and can be made larger as desired. Generally however, it is not desirable to make it much larger in view of the fact that a small unit can still be installed on a relatively large diameter pipeline. Moreover, this utilizes a plunger where the plunger travel is preferably one half inch in distance. Again, these are matters of scale and can be varied as the circumstances dictate.

While the foregoing is directed to the preferred embodiment, the scope thereof is determined by the claims which follow.

What is claimed is:

1. A pig passage indicator comprising:
   (a) an elongate hollow body having a remote end adapted to be fixedly joined with a pipeline at an opening into the pipeline;
   (b) a plunger having a an exposed probe in said body wherein said probe is contoured for non-snagging contact with a pig passing in the pipeline;

(c) resilient means acting against said plunger to urge said plunger toward the interior of the pipeline so that said plunger is contacted by a pig passing through the pipeline;

(d) a rod connected to said plunger and extending from said plunger and said body to an exterior end exposed for movement;

(e) alarm means connected with said rod and operatively moved between quiescent and alarm conditions on movement of said rod; and (f) first and second seal means sealingly joining with said body and securing said plunger for sliding movement without leakage, and also securing said rod for movement without leakage wherein said rod extends from said body so that a fluid isolation chamber is defined between said first and second seal means within said body.

2. The apparatus of claim 1 wherein said body includes an external set of threads which enable threaded attachment to a surrounding and internally threaded fitting attaching said body at an opening in the pipeline.

3. The apparatus of claim 1 wherein said fluid isolation chamber includes a transverse shoulder, and said resilient means comprises a coil spring bears against said shoulder at one end of said coil spring and said coil spring bearing against said plunger at another end thereof to urge said plunger toward a position for interception of a pig in the pipeline.

4. The apparatus of claim 1 wherein said alarm means includes a connective link and movable pin wherein said pin moves, and thereby releases a movably mounted flag for gravity induced movement between said quiescent and alarm conditions.

5. The apparatus of claim 1 wherein said alarm means includes a connective link and movable pin wherein said pin moves, and thereby releases a movably mounted flag for magnetically coupled spring induced movement between said quiescent and alarm conditions.

6. The apparatus of claim 1 wherein said alarm means includes a connective link and moveable pin wherein pin moves, and thereby releases a moveably mounted flag for movement between alarm and non-alarm conditions.

7. The apparatus of claim 1 wherein said plunger has a rounded probe tip.

8. The apparatus of claim 1 wherein said rod connects to said probe, and said rod passes through said second seal means.

9. The apparatus of claim 1 wherein said plunger is an elongate cylindrical member fitting within an elongate hollow sleeve formed of polymeric material to define said first seal means excluding fluid from the pipeline, and said second seal means is a separate seal, said first and second seal means defining said fluid isolation chamber therebetween and said chamber is adapted to vary internal pressure therein in relation to pressure within the pipeline.

10. The apparatus of claim 9 wherein said body is formed of an outer hollow cylindrical housing threading to an internal sleeve.

* * * * *